United States Patent [19]
Shikama et al.

[11] Patent Number: 6,037,716
[45] Date of Patent: Mar. 14, 2000

[54] DEGAUSSING CIRCUIT WITH A PTC THERMISTOR

[75] Inventors: Takashi Shikama; Yuichi Takaoka, both of Kyoto, Japan

[73] Assignee: Murata Manufacturing Co., Ltd., Kyoto, Japan

[21] Appl. No.: 09/188,842

[22] Filed: Nov. 9, 1998

[30] Foreign Application Priority Data

Dec. 19, 1997 [JP] Japan .................................. 9-351438

[51] Int. Cl.[7] .............................. H01J 29/56; H04N 9/29
[52] U.S. Cl. .................. 315/8; 315/370; 315/85
[58] Field of Search ............................ 315/85, 291, 307, 315/209 R, 8, 370; 363/97, 131; 361/267, 149, 150, 21

[56] References Cited

U.S. PATENT DOCUMENTS

| | | | |
|---|---|---|---|
| 5,170,096 | 12/1992 | Kang et al. ................................. | 315/8 |
| 5,357,398 | 10/1994 | Kamijoh .................................. | 361/267 |
| 5,404,084 | 4/1995 | Onodera et al. ......................... | 315/370 |
| 5,672,940 | 9/1997 | Wu ............................................. | 315/8 |
| 5,831,508 | 11/1998 | Ikeda ........................................ | 337/35 |
| 5,892,671 | 4/1999 | Francois et al. ......................... | 363/97 |

*Primary Examiner*—Don Wong
*Assistant Examiner*—Wilson Lee
*Attorney, Agent, or Firm*—Majestic, Parsons, Siebert & Hsue P.C.

[57] ABSTRACT

A degaussing circuit is formed as a series connection of a PTC element and a degaussing coil operated such that the operating frequency of the current therethrough is higher than the frequency of the power source line for the device such as a color television set in which this degaussing circuit is incorporated. This frequency conversion may be effected by a circuit which also functions to convert the alternating current from the power source line into a direct current. The degaussing circuit may further include a relay circuit for switching on and off the current through the PTC element and the degaussing coil.

10 Claims, 3 Drawing Sheets

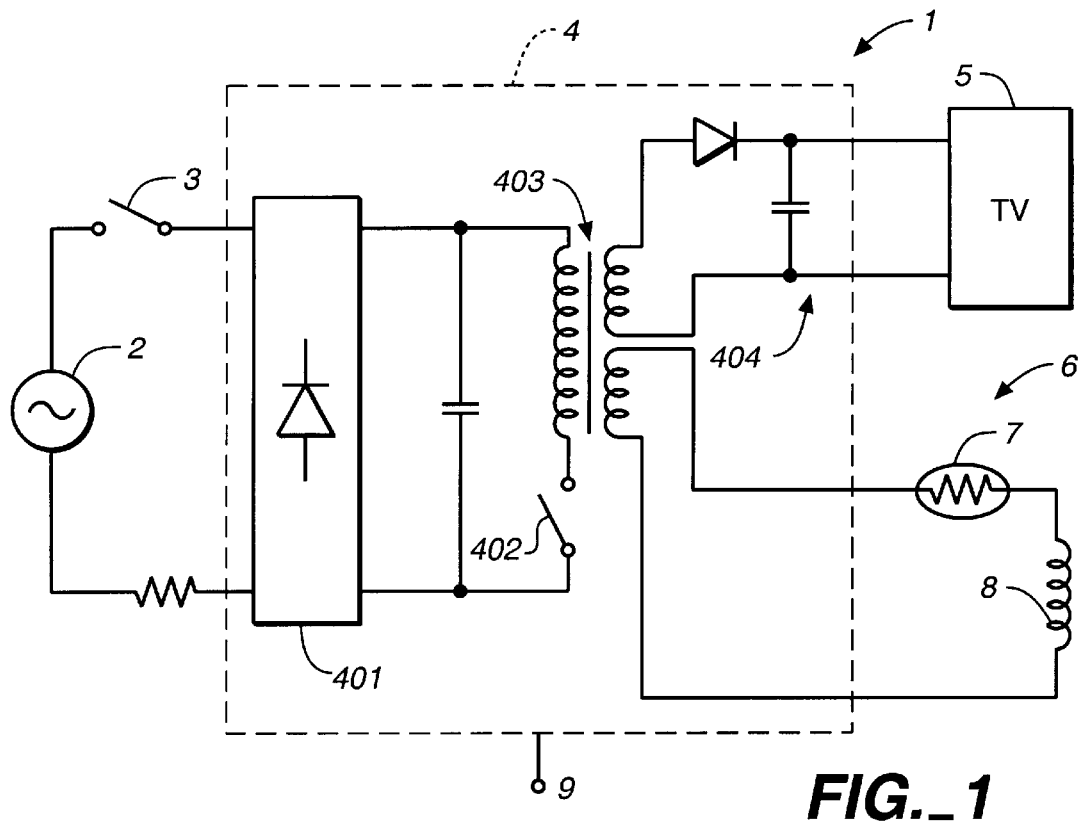
FIG._1
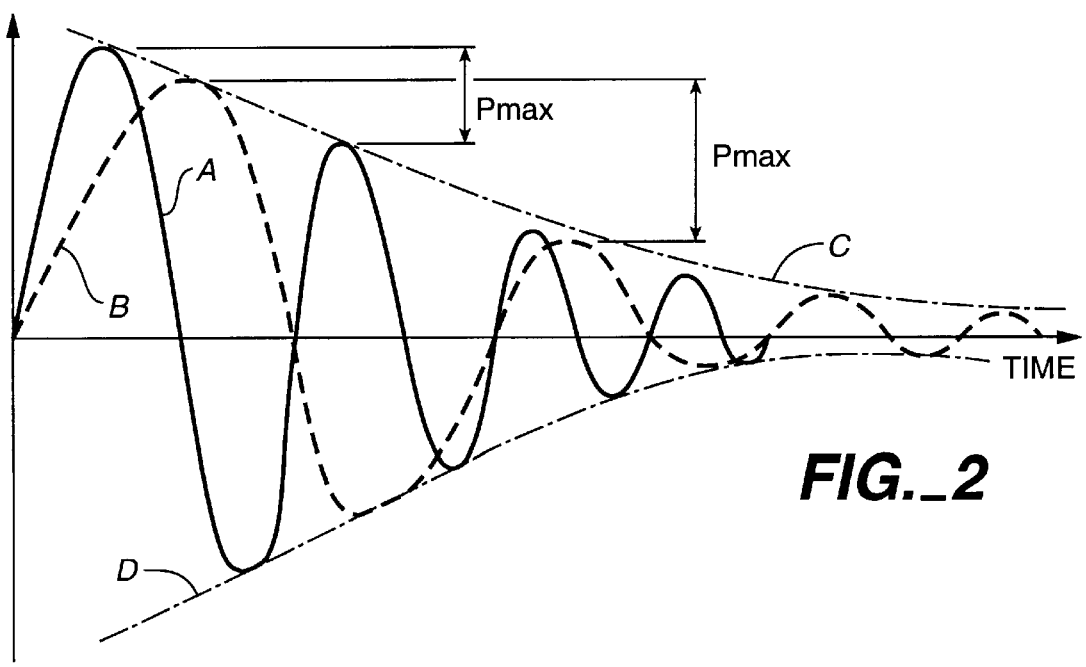
FIG._2

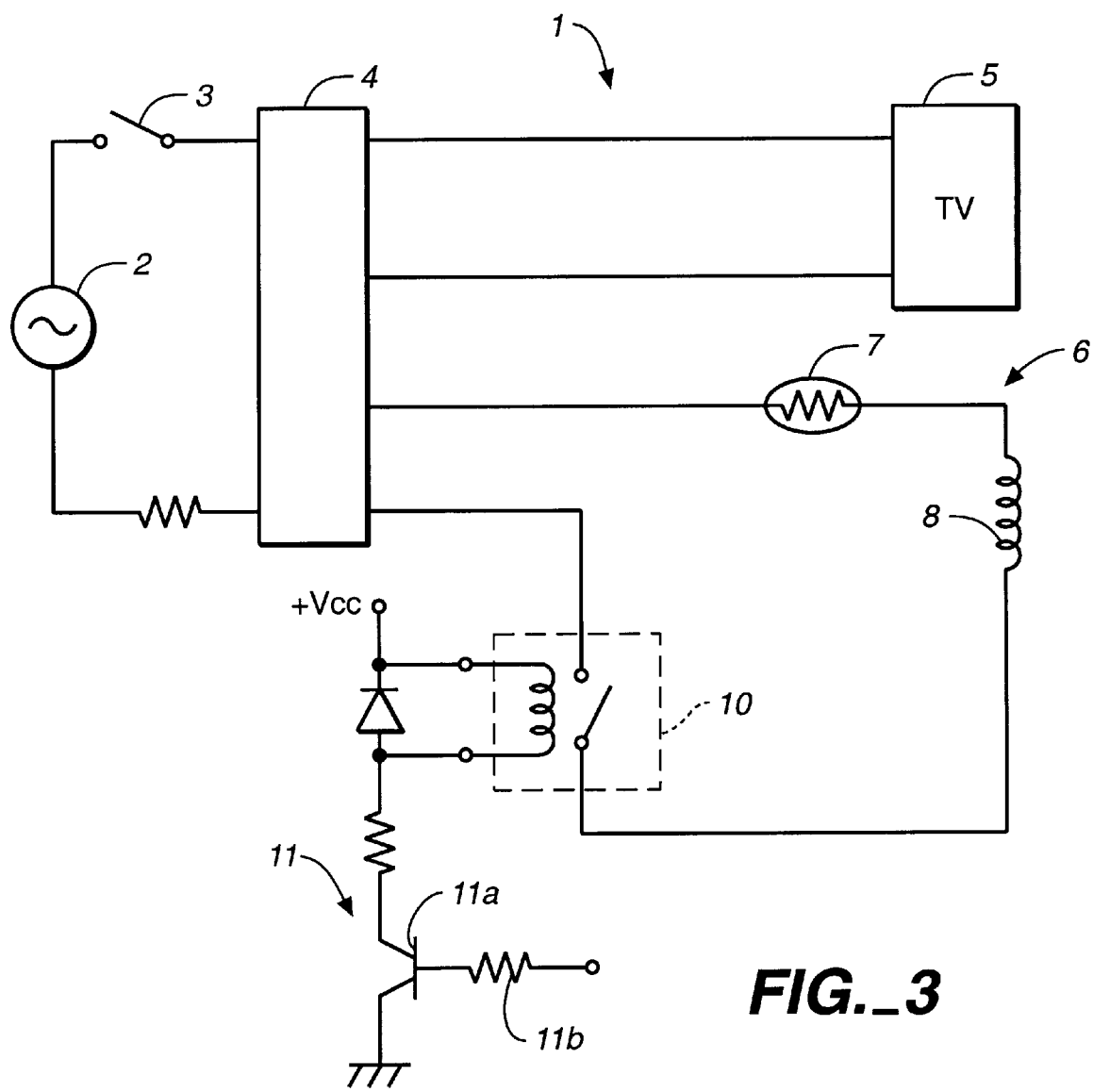
FIG._3

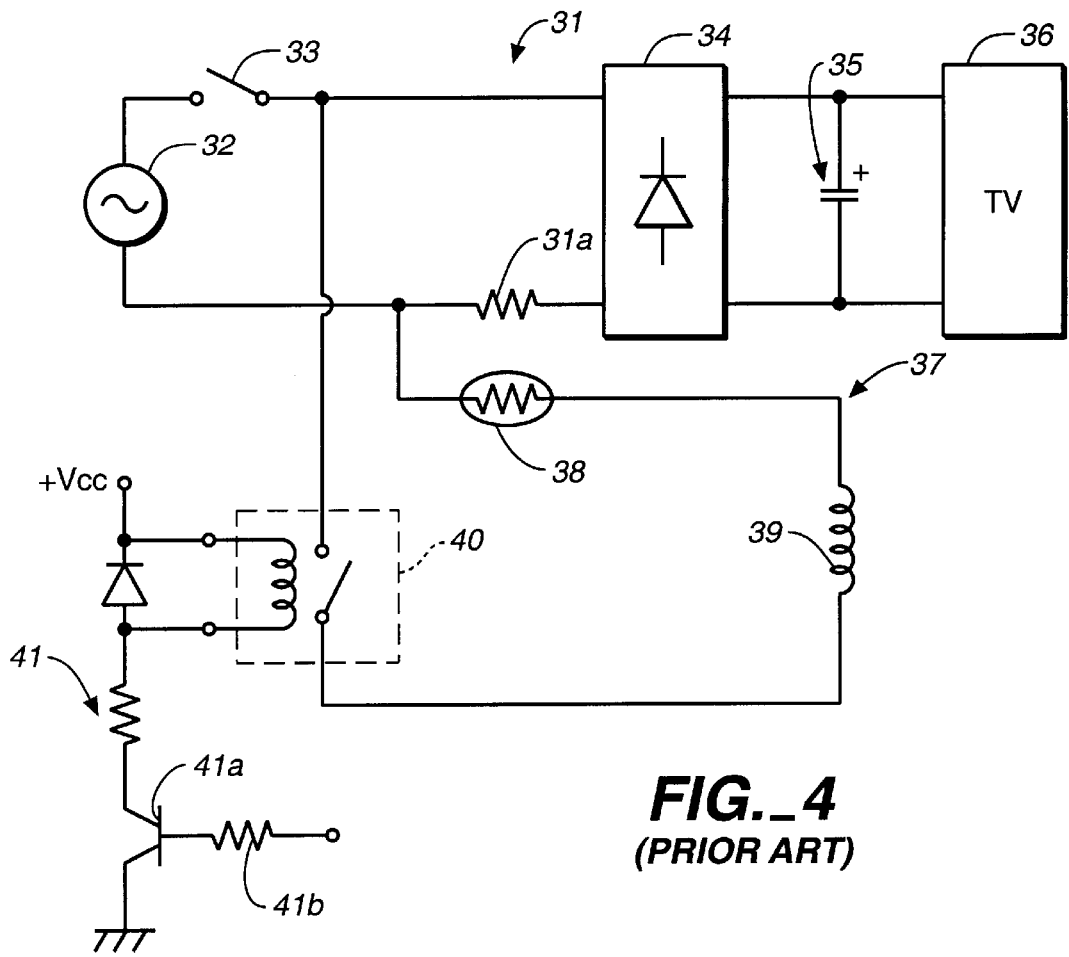
FIG._4
(PRIOR ART)
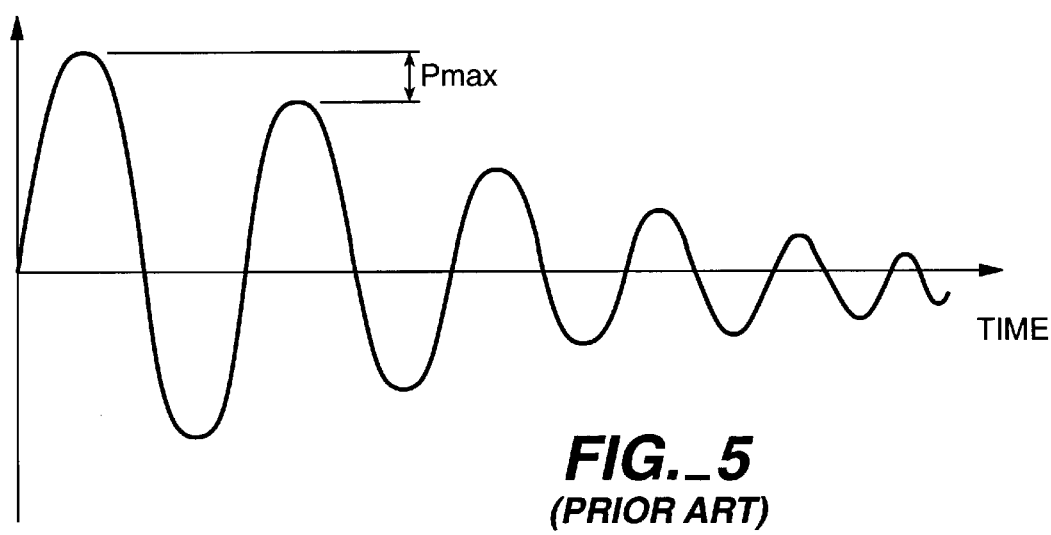
FIG._5
(PRIOR ART)

6,037,716

DEGAUSSING CIRCUIT WITH A PTC THERMISTOR

BACKGROUND OF THE INVENTION

This invention relates to a degaussing circuit of the type commonly used in color television sets and color monitors. More particularly, this invention relates to an improved degaussing circuit having a degaussing coil and a thermistor element with a positive temperature coefficient for its resistance (or a PTC element) connected in series.

FIG. 4 is a circuit diagram of a power source part 31 and its adjoining parts of a prior art color television set, showing a power source 32 of frequency 50 or 60 Hz. The power source part 31 includes a main switch 33 connected in series with the power source 32, a rectifying circuit 34 which may comprise a diode and a smoothing circuit 35 with a capacitor. The main circuit 36 of a color television set may be connected to this power source part 31 such that power is supplied from the latter to the former.

A degaussing circuit 37 for degaussing (or demagnetizing) the cathode ray tube of the color television set is also connected to the power source part 31. The degaussing circuit 37 includes a PTC element 38 and a degaussing coil 39 which are connected to each other in series. A relay 40 for switching the degaussing circuit 37 on and off is connected, and there is also provided a driver circuit 41 for supplying HIGH and LOW voltage signals for switching the relay 40 on and off. The driver circuit 41 includes a transistor 41a serving as a switching element connected between a power source voltage terminal $+V_{cc}$ and the ground potential. The HIGH and LOW voltage signals are applied to the base terminal of the transistor 41a through a resistor 41b so as to switch the relay 40 on and off. In FIG. 4, numeral 31a indicates a fixed resistor for attenuating the rush current when the power source part 31 is switched on. This fixed resistor 31a may be replaced by an NTC element.

Operations of the degaussing circuit 37 shown in FIG. 4 will be described next. In the beginning, since the relay 40 is in the closed condition, a current corresponding to the frequency of the power source 32 flows into the degaussing circuit 37 when the main switch 33 of the color television set is switched on, and this is transformed by the PTC element 38 into an alternating decay current with the same frequency. An alternating decay magnetic field corresponding to this alternating decay current is generated by the degaussing coil 39 and the cathode ray tube disposed close by is thereby degaussed, or demagnetized.

This act of degaussing is completed within a few seconds after the main switch 33 is switched on. Thus, the degaussing circuit 37 may be switched off by activating the driver circuit 41 through a time constant circuit (not shown) to open the relay 40 and to stop the current to the degaussing circuit 37. Thereafter, the degaussing circuit 37 will not be activated until the main switch 33 is switched on again.

The aforementioned alternating decay current which flows through the degaussing coil 39 is as shown in FIG. 5, its amplitude decreasing with time but its frequency remaining the same as that of the commercial power source supplied from the power source 32, that is, 50 Hz or 60 Hz. If the amplitude differential $P_{max}$, or the difference between the peak amplitude in one period of the alternating current and that of the next period (as shown in FIG. 5), is too large, the cathode ray tube may end up being magnetized instead such that not only does it fail to be demagnetized but an unevenness in color may be generated on the screen.

One of the attempts to prevent such an occurrence has been to use a larger PTC element 38 so as to reduce the magnitude of the amplitude differential $P_{max}$. In order to make $P_{max}$ smaller, it is necessary to attenuate the current more slowly. This may be accomplished by slowing down the increase in the resistance of the PTC element (or its temperature) and it has been known to use a larger element with a larger thermal capacity for this purpose. If a larger PTC element 38 is used, however, the degaussing circuit 37 cannot be miniaturized and hence the portion of the color television set which incorporates it also cannot be made compact.

SUMMARY OF THE INVENTION

It is therefore an object of this invention in view of the above to provide a compact degaussing circuit which does not require a large PTC element to reduce the amplitude differential of the alternating decay current therethrough and can still demagnetize its target circuit part dependably.

A degaussing circuit embodying this invention, with which the above and other objects can be accomplished, may be characterized not only as comprising a series connection of a PTC element and a degaussing coil but also wherein the operating frequency of the current therethrough is made higher than the frequency of the power source line for the device in which this degaussing circuit is incorporated. According to an embodiment of this invention, this frequency conversion is effected by a source circuit which also functions to convert the alternating current from the power source line into a direct current. The degaussing circuit may further include a relay circuit for switching on and off the current through the PTC element and the degaussing coil.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a circuit diagram of a portion including a power source circuit of a color television set incorporating a degaussing circuit embodying this invention;

FIG. 2 is a graph of alternating decay currents resulting from the circuit of FIG. 1 and according to a prior art technology;

FIG. 3 is a circuit diagram of a portion including a power source circuit of a color television set incorporating another degaussing circuit embodying this invention;

FIG. 4 is a circuit diagram of a prior art degaussing circuit; and

FIG. 5 is a graph of alternating decay current resulting from the prior art circuit of FIG. 4.

Throughout herein, like or equivalent components are indicated by the same numerals even where they are components of different devices and may not necessarily be described repetitiously.

DETAILED DESCRIPTION OF THE INVENTION

The invention is described next by way of examples.

FIG. 1 is a circuit diagram of a portion including a power source part 1 of a color television set incorporating a degaussing circuit according to a first embodiment of this invention. This power source part 1, too, includes a main switch 3 connected in series with a commercial power source 2 of frequency 50 Hz or 60 Hz. On the downstream side of the main switch 3 (away from the power source 2) is a power source circuit 4 including therein a frequency conversion circuit for carrying out an alternating-to-direct ("AC-to-DC" or "AD") conversion of the current supplied from the commercial power source 2 and thereafter carrying out a direct-to-alternating ("DC-to-AC" or "DA") conversion so as to obtain a higher frequency than that of the commercial power source 2.

Explained more in detail by way of an example with reference to FIG. 1, the power source circuit 4 may include a first rectifying circuit 401 for generating a direct current from the alternating current from the commercial power source 2 and a switching element 402 adapted to open and close this direct current circuit so as to generate an intermittent current through the primary coil of a transformer 403 serving as a converter. A secondary coil of the transformer 403 is connected to a second rectifying circuit 404 which is intended to be connected to the main circuit of a color television set (indicated by numeral 5). Another secondary coil of the transformer 403 is connected to a degaussing circuit 6 such that the degaussing circuit 6 receives an alternating current with frequency made higher than that of the commercial power source 2 by the transformer 403.

The degaussing circuit 6 comprises a PTC element 7 and a degaussing coil 8 which are connected in series to each other. Numeral 9 in FIG. 1 schematically indicates a terminal through which a signal is adapted to be inputted for indicating the end of the degaussing so as to stop the supply of the current from the switching power source 4 to the degaussing circuit 6.

Operations of the degaussing circuit 6 according to this invention will be described next. As the main switch 3 is closed, a current is supplied from the power source circuit 4 to the main circuit 5 and the degaussing circuit 6. In the meantime, the transformer 403 causes a current with a higher frequency than that of the commercial power source 2 to be supplied to the degaussing circuit 6. Inside the degaussing circuit 6, the alternating current supplied thereto is attenuated and an alternating decay magnetic field corresponding to this alternating decay current is generated by the degaussing coil 8 and serves to demagnetize the cathode ray tube of the color television set.

After the degaussing is completed, the operation of the power source circuit 4 is stopped so as to stop the supply of current to the degaussing circuit 6. In other words, the relay 40 and the driver circuit 41 of FIG. 4 can be dispensed with and the production cost of the device into which the degaussing circuit 6 is incorporated can be reduced.

The most important characteristic of this invention is that the power source circuit 4 causes a current with a higher frequency than that of the commercial power source 2 to be supplied to the degaussing circuit 6 such that the degaussing circuit 6 functions by this operating current with the higher frequency. As a result, the amplitude differential $P_{max}$, or the difference between the peak amplitude in one period of the aforementioned alternating decay current and that in the next period can be reduced. This will be explained next more in detail with reference to FIG. 2.

In the graph of FIG. 2, the solid line A indicates the alternating decay current generated in the degaussing circuit 6, and the broken line B indicates that generated in a prior art degaussing circuit. The frequency of the alternating decay current generated by the PTC element 7 and the degaussing coil 8 depends on that of the operating current for the degaussing circuit 6, or that of the current supplied to the degaussing circuit 6. Thus, as shown in FIG. 2, the solid line A oscillates at a higher frequency than the broken line B.

The shape of the envelopes C and D of this decay curve A is determined by the physical characteristics of the PTC element 7 such as its volume and thermal capacity, as well as the rate of its heat emission, but is independent of the frequency of the current which flows through. In other words, as long as the same PTC element 7 is used, the two curves A and B have the same envelopes C and D. Thus, if the frequency is increased, the time interval between the two current peaks in the same direction becomes shorter and the amplitude differential $P_{max}$, as defined above, becomes smaller, as clearly indicated in FIG. 2.

Let us assume, for example, that a current of frequency 50 Hz is supplied from the commercial power source 2 to the power source circuit 4 and that the transformer 403 converts it into a current of frequency 100 Hz. Since the envelopes C and D as shown in FIG. 2 are the same for the two currents, the amplitude differential $P_{max}$ becomes about one half by this conversion. If the power source circuit 4 makes the conversion into a current of frequency 150 Hz in the example described above, the amplitude differential $P_{max}$ is likewise reduced to about one third. In other words, the amplitude differential $P_{max}$ can be made smaller by increasing the frequency of the current supplied to the degaussing circuit 6, and the degaussing of the cathode ray or the like can be effected more dependably.

If the frequency of the current supplied to the degaussing circuit 6 is increased excessively, however, the PTC element 7 may fail to exhibit its PTC characteristics and the degaussing coil 8 begins to play the role of an antenna, tending to generate unwanted radiation. In view of such effects, it is desirable not to increase the frequency of the current supplied to the degaussing circuit 6 (or its operating current) beyond 500 Hz, and more preferably beyond 300 Hz. For carrying out the degaussing dependably, on the other hand, it is desirable that the frequency of the operating current of the degaussing circuit be raised to 100 Hz or over. In summary, the desired range of frequency is 100–500 Hz and the range of 100–300 Hz is even more preferable.

FIG. 3 shows another circuit according to a second embodiment of this invention which is similar to the circuit described above with reference to FIG. 1 but different therefrom in that a relay 10 is connected to the degaussing circuit 6 for switching it off. Similar to the prior art circuit shown in FIG. 4, the relay 10 is connected to a driver circuit 11 which serves to switch the relay 40 on and off, including a transistor 11a serving as a switching element connected between a power source voltage terminal +$V_{cc}$ and the ground potential. A timing signal is adapted to be applied to the base terminal of this transistor 11a through a resistor 11b so as to switch the relay 10 on and off.

Although the invention has been described above with reference to a limited number of examples, these examples are not intended to limit the scope of the invention. Many modifications and variations are possible within the scope of the invention. For example, many circuits or devices of different kinds can be used to switch off the degaussing circuit 6 after a specified length of time. Although FIGS. 1 and 3 showed embodiments wherein the transformer 403 serving as frequency conversion means is contained as a part of the power source circuit 4, a frequency conversion circuit adapted to output a current with a higher frequency than that of the commercial power source 2 may be connected to the downstream side of the power source circuit 4 such that a current with a high frequency can be supplied to the degaussing circuit 6 through such a frequency conversion circuit. Furthermore, the power source circuit 4 as shown in FIGS. 1 and 3 may be dispensed with, while a suitable frequency conversion circuit is inserted between a power source circuit as shown at 31 in FIG. 4 and the degaussing circuit.

What is claimed is:

1. A degaussing circuit incorporated in a device, receiving power from a power source line operating at a specified initial frequency, said degaussing circuit comprising:

a series connection of a PTC element and a degaussing coil; and a frequency conversion means for converting said specified initial frequency of said power source line to provide an operating current with a higher frequency than said specified initial frequency to said series connection.

2. The degaussing circuit of claim 1 wherein said frequency conversion means is a part of a source circuit which functions to convert an alternating current from said power source line into a direct current.

3. The degaussing circuit of claim 1 wherein said higher frequency of said operating current is 100–300 Hz.

4. The degaussing circuit of claim 2 wherein said higher frequency of said operating current is 100–300 Hz.

5. The degaussing circuit of claim 1 further comprising a relay circuit serving to switch on and off a current through said series connection.

6. The degaussing circuit of claim 2 further comprising a relay circuit serving to switch on and off a current through said series connection.

7. The degaussing circuit of claim 3 further comprising a relay circuit serving to switch on and off a current through said series connection.

8. The degaussing circuit of claim 4 further comprising a relay circuit serving to switch on and off a current through said series connection.

9. The degaussing circuit of claim 1 wherein said frequency conversion means include a first rectifier for rectifying said alternating current from said power source line, a transformer with a primary coil and secondary coils, a switching means for intermittently switching on and off the rectified current to generate an intermittent current and causing said intermittent current to pass through said primary coil of said transformer, and a second rectifier for rectifying an alternating current generated from one of said secondary coils of said transformer.

10. The degaussing circuit of claim 2 wherein said frequency conversion means include a first rectifier for rectifying said alternating current from said power source line, a transformer with a primary coil and secondary coils, a switching means for intermittently switching on and off the rectified current to generate an intermittent current and causing said intermittent current to pass through said primary coil of said transformer, and a second rectifier for rectifying an alternating current generated from one of said secondary coils of said transformer.

* * * * *